US012803686B2

(12) United States Patent
Epifani et al.

(10) Patent No.: US 12,803,686 B2
(45) Date of Patent: Nov. 17, 2026

(54) METHOD FOR COMPUTING SINR IN A CELLULAR COMMUNICATION SYSTEM

(71) Applicant: Telecom Italia S.p.A., Milan (IT)

(72) Inventors: Francesco Epifani, Turin (IT); Roberto Lanzo, Turin (IT); Giuseppe Minerva, Turin (IT); Andrea Schiavoni, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 309 days.

(21) Appl. No.: 18/724,654

(22) PCT Filed: Dec. 14, 2022

(86) PCT No.: PCT/EP2022/085981
§ 371 (c)(1),
(2) Date: Jun. 27, 2024

(87) PCT Pub. No.: WO2023/126184
PCT Pub. Date: Jul. 6, 2023

(65) Prior Publication Data

US 2025/0175268 A1 May 29, 2025

(30) Foreign Application Priority Data

Dec. 29, 2021 (IT) ........................ 102021000032972

(51) Int. Cl.

| | |
|---|---|
| ***H04B 17/336*** | (2015.01) |
| ***H04B 7/06*** | (2006.01) |
| ***H04W 16/22*** | (2009.01) |
| ***H04W 16/28*** | (2009.01) |

(52) U.S. Cl.
CPC ......... *H04B 17/336* (2015.01); *H04B 7/0695* (2013.01); *H04W 16/22* (2013.01); *H04W 16/28* (2013.01)

(58) Field of Classification Search
CPC ... H04B 17/336; H04B 7/0695; H04W 16/22; H04W 16/28
See application file for complete search history.

(56) References Cited

U.S. PATENT DOCUMENTS 8,423,047 B1 4/2013 Zang et al.
2007/0115800 A1 5/2007 Fonseka et al.
2014/0098783 A1* 4/2014 Wan ...................... H04L 5/0073 370/330

(Continued)

FOREIGN PATENT DOCUMENTS

EP 3010255 A1 * 4/2016 ............ H04W 4/029

OTHER PUBLICATIONS

International Search Report and Written Opinion mailed on Feb. 9, 2023, received for PCT Application PCT/EP2022/085981, filed on Dec. 14, 2022, 10 pages.

*Primary Examiner* — John D Blanton
(74) *Attorney, Agent, or Firm* — XSENSUS LLP

(57) ABSTRACT

A method is proposed for computing a signal-to-interference-plus-noise ratio in a territorial portion of a geographic area covered by a cellular network. The cellular network comprises a plurality of network cells provided by respective beamforming active antennas each one configured to radiate traffic beams in a plurality of radiating directions depending on number and arrangement of array elements of the beamforming active antenna.

10 Claims, 5 Drawing Sheets

(56) References Cited

U.S. PATENT DOCUMENTS

Figure 1:
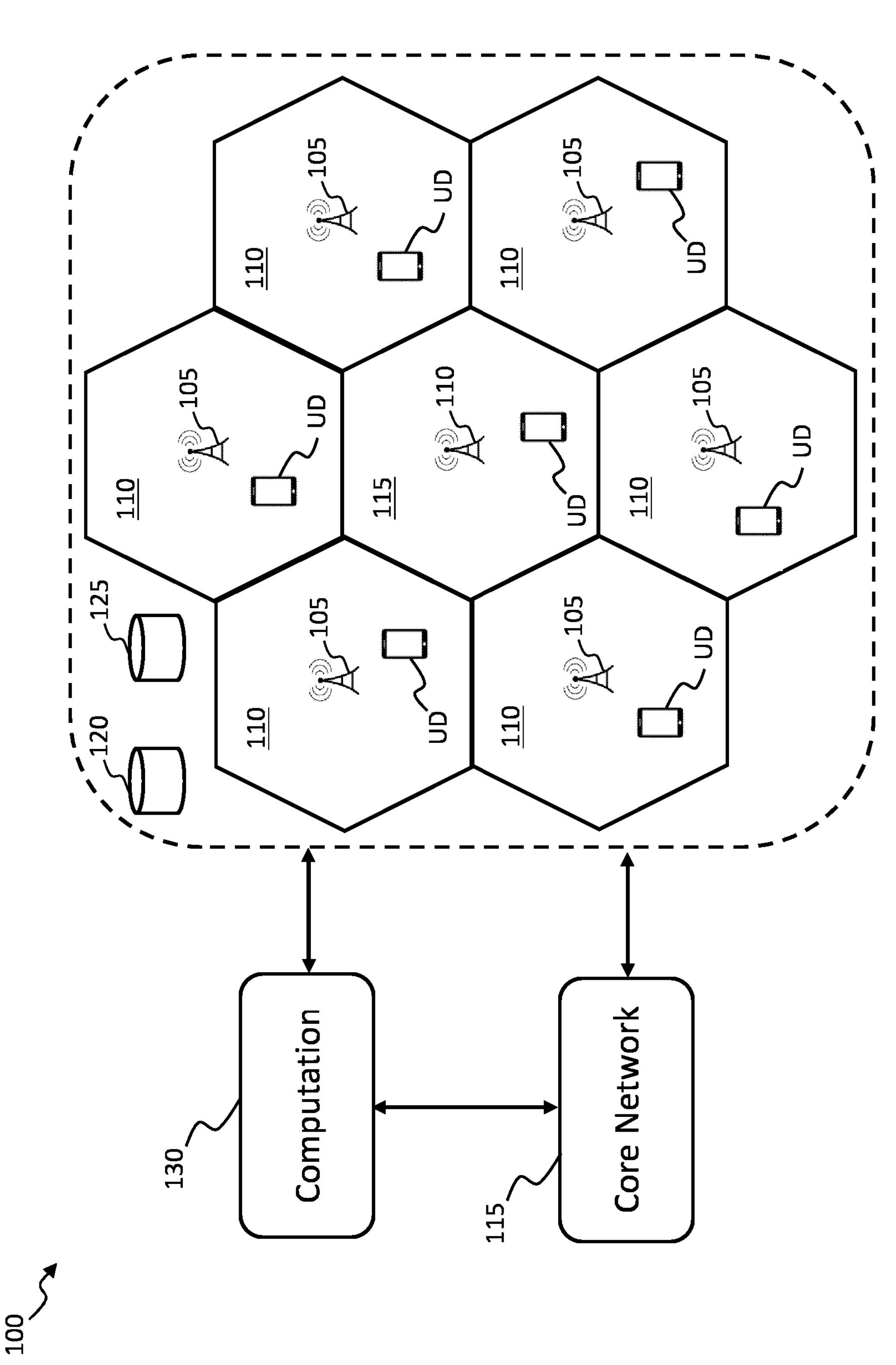

| | | | | |
|---|---|---|---|---|
| 2016/0380820 | A1* | 12/2016 | Horvitz | H04W 16/28 370/254 |
| 2020/0211580 | A1* | 7/2020 | Lee | G06N 3/09 |
| 2021/0203413 | A1* | 7/2021 | Hamet | H04B 7/0456 |
| 2022/0179032 | A1* | 6/2022 | Hancharik | G01S 3/38 |
| 2022/0225127 | A1* | 7/2022 | Imran | G06N 7/01 |
| 2023/0140473 | A1* | 5/2023 | Paredes Cabrera | H04W 36/008375 455/456.1 |
| 2023/0403543 | A1* | 12/2023 | Pateromichelakis | H04L 41/0686 |
| 2023/0412608 | A1* | 12/2023 | Vaishnavi | H04L 63/102 |
| 2024/0224082 | A1* | 7/2024 | Yang | H04W 24/04 |
| 2025/0175268 | A1* | 5/2025 | Epifani | H04B 17/336 |
| 2025/0253914 | A1* | 8/2025 | Svendsen | H04B 7/06968 |
| 2025/0317185 | A1* | 10/2025 | Murakami | H04W 16/14 |
| 2026/0135601 | A1* | 5/2026 | Luo | H04B 7/06952 |
| 2026/0163700 | A1* | 6/2026 | Matsumura | H04L 5/0053 |

* cited by examiner envelope traffic radiation pattern

"modulated" envelope traffic radiation pattern

| Front best server sector | | Rear best server sector |
|---|---|---|
| I | → | IX |
| II | → | X |
| III | → | XI |
| IV | → | XII |
| V | → | XIII |
| VI | → | XIV |
| VII | → | XV |
| VIII | → | XVI |

METHOD FOR COMPUTING SINR IN A CELLULAR COMMUNICATION SYSTEM

CROSS-REFERENCE TO RELATED APPLICATIONS

This application is a national stage application, filed under 35 U.S.C. § 371, of International Patent Application No. PCT/EP2022/085981, filed Dec. 14, 2022, which claims priority from Italian Patent Application No. 102021000032972, filed Dec. 29, 2021, the entire contents of each are incorporated herein by reference.

BACKGROUND OF THE INVENTION

Field of the Invention

The present invention relates to a cellular communication system, such as a cellular communication system compliant with fifth generation (5G) technology standard (or 5G cellular communication system). More particularly, the present invention relates to a method for computing (or determining or estimating) a signal-to-interference-plus-noise ratio (SINR) in a 5G cellular communication system, or in any other cellular communication system exploiting or making use of active antennas (such as beamforming active antennas).

Overview of the Related Art

Deployment of 5G cellular communication systems is more and more widespread.

Beamforming active antennas are important components of the 5G cellular communication systems.

A beamforming antenna is a radiating apparatus comprising a plurality of antenna elements (each one corresponding to the smallest radiating element which is part of the radiating apparatus), and a plurality of arrays of antenna elements (array elements). Each array element typically comprises a set of antenna elements (i.e., the smallest set of antenna elements) that can be activated to generate, singularly or together with the other antenna elements of the array element, a directional beam having minimum angular amplitude.

Each array element may generate directional beams by means of proper time or phase shifting of radio signals emitted by the respective antenna elements.

An active antenna is a radiating apparatus that may be described by one or more broadcast radiation patterns and by one or more traffic radiation patterns, and is capable of real-time performing radiation pattern reconfiguration to serve, with performance continuity, user devices that may change position and/or typology of requested services over time.

The broadcast radiation pattern typically identifies the directional (angular) dependence of the strength of broadcast beams from the antenna, such as the beams containing common information for all user devices.

The traffic radiation pattern typically identifies the directional (angular) dependence of the strength of traffic beams from the antenna, such as the beams containing specific information for independent user devices.

SINR is an important parameter to measure a quality of the cellular communication systems, including the 5G cellular communication systems and any other cellular communication system exploiting or making use of beamforming active antennas.

Moreover, SINR may also be used to set (i.e., tune or adjust) one or more network parameters (for example, by exploiting "Self-Organizing Network" (SON) functionalities).

SUMMARY OF INVENTION

The Applicant has found that the known methods of computing SINR are not satisfactory for 5G cellular communication systems, or for any other cellular communication system exploiting or making use of beamforming active antennas.

The Applicant has understood that performance of an array element is a function of array geometry (for example, linear, circular or rectangular), number of antenna elements, spacing between antenna elements, number of interfering users and direction of arrival of the useful and interfering signals.

As a result of it, due to the use of beamforming active antennas, each network cell experiences directional (angular) dependence of the strength broadcast and traffic beams and radiation pattern reconfigurations, whereby a precise SINR computation for each network cell is inherently not possible.

In this respect, the Applicant has faced the above-mentioned issues, and has devised a method for computing SINR in 5G cellular communication systems (or in any other cellular communication system exploiting or making use of beamforming active antennas).

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies mutatis mutandis to any other aspect).

More specifically, an aspect of the present invention relates to a method for computing a signal-to-interference-plus-noise ratio in a territorial portion of a geographic area covered by a cellular network.

According to an embodiment, the cellular network comprises a plurality of network cells provided by respective beamforming active antennas each one configured to radiate traffic beams in a plurality of radiating directions depending on number and arrangement of array elements of the beamforming active antenna.

According to an embodiment, the method comprises subdividing each network cell into a plurality of cell sectors each one corresponding to a respective radiating direction among the plurality of radiating directions in which the corresponding beamforming active antenna is configured to radiate.

According to an embodiment, the method comprises determining, for each cell sector of each network cell, a respective radiation probability indicative of the probability that the respective beamforming active antenna radiates traffic beams in that cell sector.

According to an embodiment, each radiation probability depends on a user propensity indicative of a propensity of users of the cellular network to be physically located and/or to generate service requests in that cell sector of that network cell.

According to an embodiment, the method comprises determining, among the plurality of network cells, a best server network cell and at least one interfering network cell associated with the territorial portion.

According to an embodiment, the method comprises computing the signal-to-interference-plus-noise ratio in the territorial portion based on a useful signal strength associated with the best server network cell, and at least one interfering signal strength associated with the at least one interfering network cell.

According to an embodiment, each interfering signal strength is weighted by a respective radiation probability associated with the cell sector of the respective interfering network cell at least partially covering the territorial portion.

According to an embodiment, the user propensity is based on at least one among:

- procedure and/or event traces of user devices within the territorial portion;
- radio measurements reported by the user devices within the territorial portion;
- territorial data related to the territorial portion.

According to an embodiment, the territorial data comprises at least one among:

- an indication of a road network in the territorial portion;
- an indication of an urbanization rate in the territorial portion;
- an indication of a type or use of the territory of the territorial portion.

According to an embodiment, said determining, for each cell sector of each network cell, a respective radiation probability comprises normalizing the user propensity associated with the cell sector on an overall user propensity associated with the network cell.

According to an embodiment, said determining, for each cell sector of each network cell, a respective radiation probability further comprises, if, for each network cell, at least one first cell sector exists whose radiation probability is lower than or equal to a threshold radiation probability:

- setting the radiation probability of each first cell sector at the threshold radiation probability; and
- for each second cell sector whose radiation probability is higher than the threshold radiation probability, setting the respective radiation probability at the radiation probability subtracted by a compensation amount indicative of an overall deviation between the threshold radiation probability and the radiation probabilities of the at least one first cell sector.

According to an embodiment, for each second cell sector, the compensation amount is proportional to a deviation between the radiation probability associated with the second cell sector and the threshold radiation probability, with respect to an overall deviation between the radiation probabilities associated with the second cell sectors and the threshold radiation probability.

According to an embodiment, said subdividing each network cell into a plurality of cell sectors comprises subdividing each network cell into a plurality of front and rear cell sectors associated with main and back lobes, respectively, of a radiation pattern of the respective beamforming active antenna.

According to an embodiment, each rear cell sector is opposite to a respective front cell sector with respect to the respective beamforming active antenna.

According to an embodiment, said determining, for each cell sector of each network cell, a respective radiation probability comprises determining the radiation probability for each front cell sector and assigning to each rear cell sector the radiation probability associated with the respective opposite front cell sector.

According to an embodiment, the method comprises managing the cellular network based on the computed signal-to-interference-plus-noise ratio.

According to an embodiment, said managing the cellular network based on the computed signal-to-interference-plus-noise ratio comprises at least one between:

- outputting the computed signal-to-interference-plus-noise ratio, and
- setting one or more parameters of the cellular network based on the computed signal-to-interference-plus-noise ratio.

Another aspect of the present invention relates to a system configured to implement the method of above.

According to an embodiment, the system is configured to compute a signal-to-interference-plus-noise ratio in a territorial portion of a geographic area covered by a cellular network, wherein the cellular network comprises a plurality of network cells provided by respective beamforming active antennas each one configured to radiate traffic beams in a plurality of radiating directions depending on number and arrangement of array elements of the beamforming active antenna.

According to an embodiment, the system comprises a computation module configured for:

- subdividing each network cell into a plurality of cell sectors each one corresponding to a respective radiating direction among the plurality of radiating directions in which the corresponding beamforming active antenna is configured to radiate;
- determining, for each cell sector of each network cell, a respective radiation probability indicative of the probability that the respective beamforming active antenna radiates traffic beams in that cell sector, each radiation probability depending on a user propensity indicative of a propensity of users of the cellular network to be physically located and/or to generate service requests in that cell sector of that network cell;
- determining, among the plurality of network cells, a best server network cell and at least one interfering network cell associated with the territorial portion, and
- computing the signal-to-interference-plus-noise ratio in the territorial portion based on a useful signal strength associated with the best server network cell, and at least one interfering signal strength associated with the at least one interfering network cell, wherein each interfering signal strength is weighted by a respective radiation probability associated with the cell sector of the respective interfering network cell at least partially covering the territorial portion.

BRIEF DESCRIPTION OF THE ANNEXED DRAWINGS

Figure 2A:
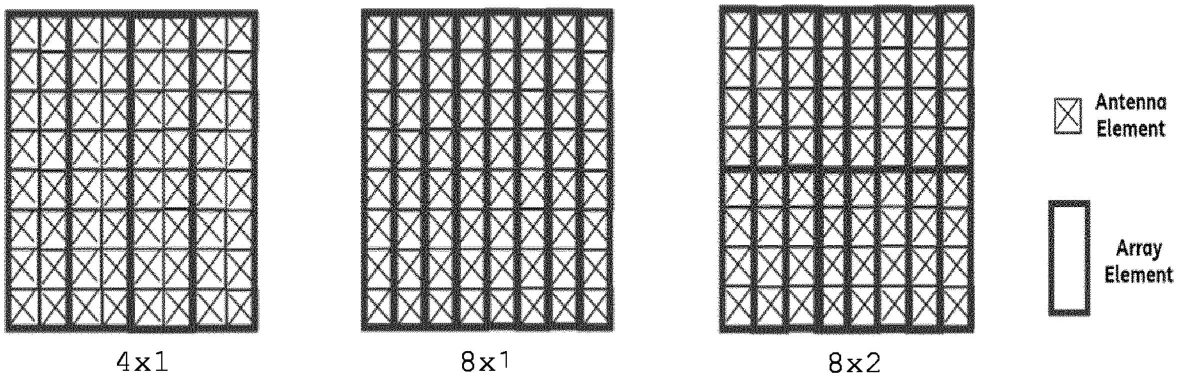
Figure 2B:
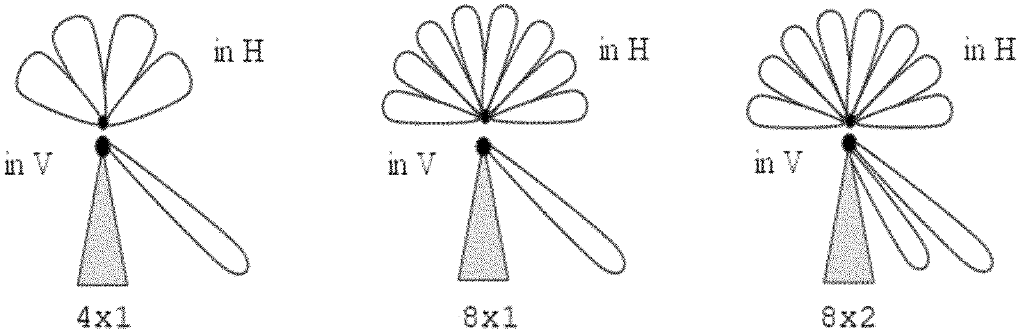
Figure 3:
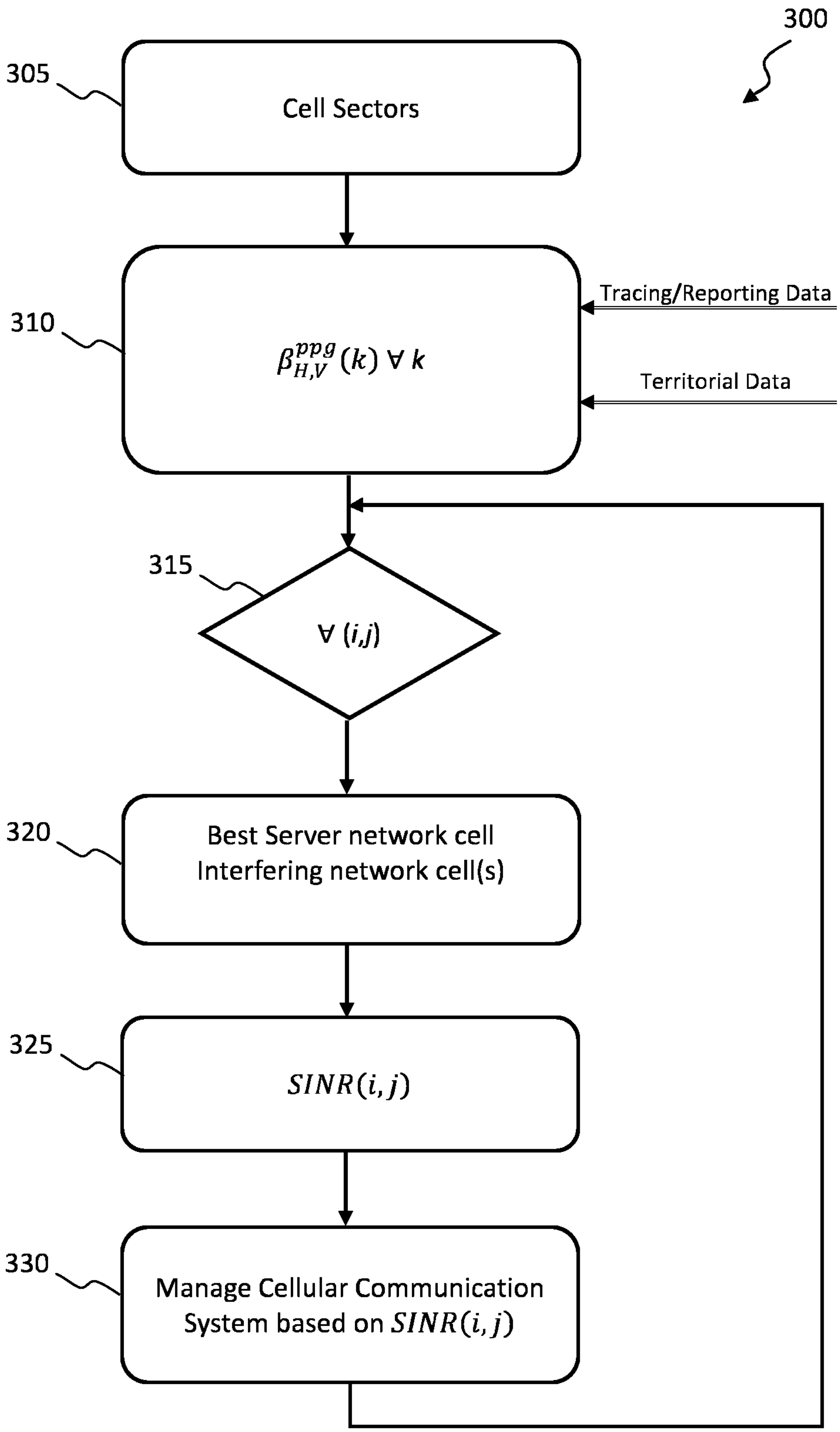
Figure 4:
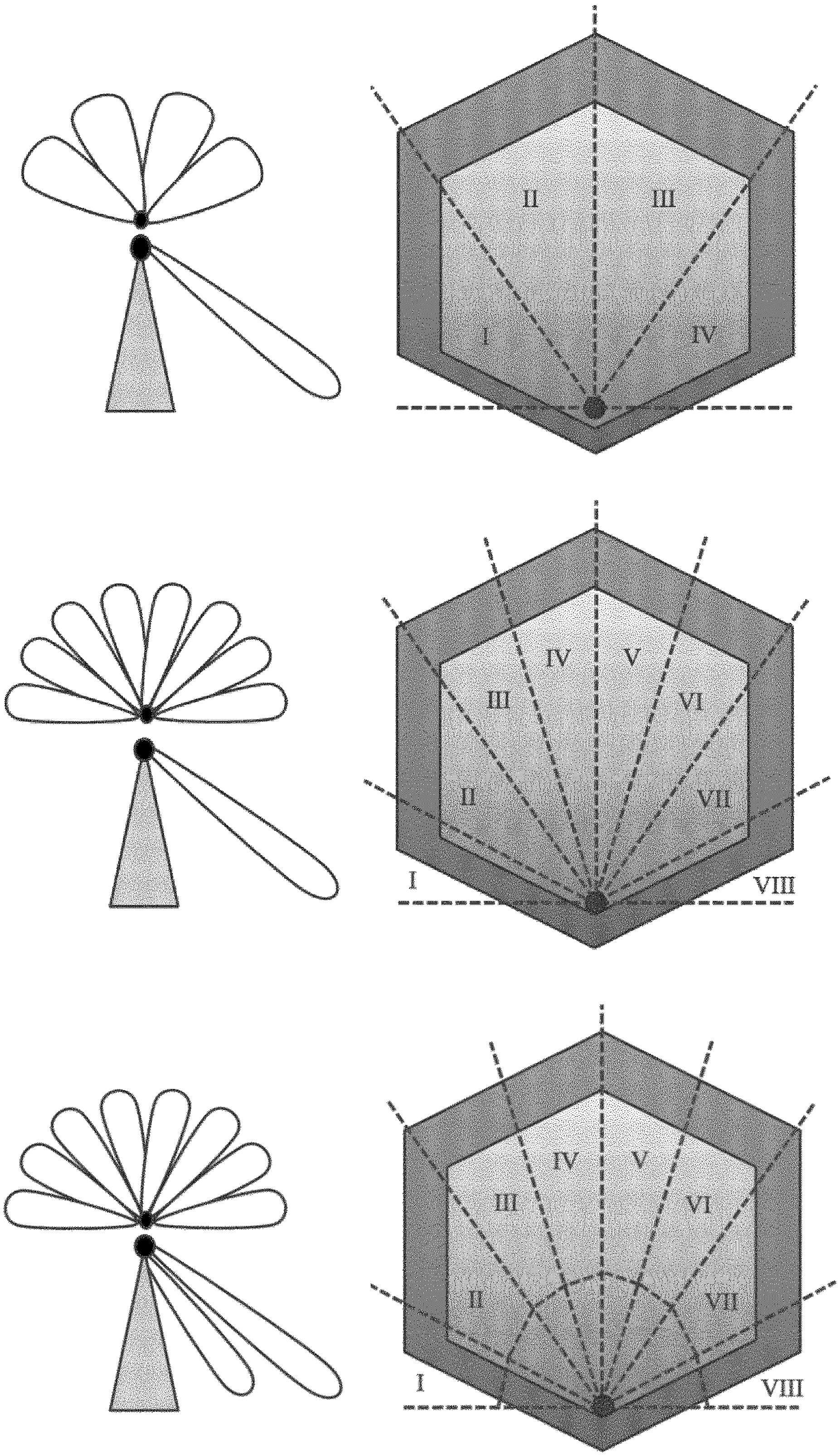
Figure 5A:
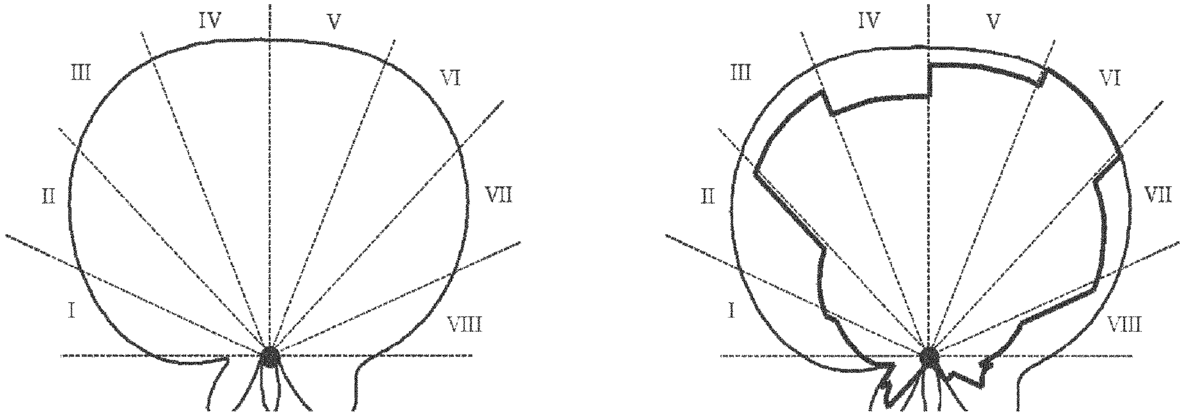
Figure 5B:
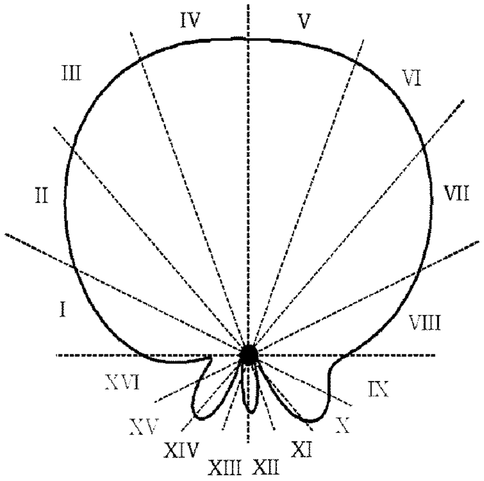

These and other features and advantages of the present invention will be made apparent by the following description of some exemplary and non-limitative embodiments thereof. For its better intelligibility, the following description should be read making reference to the attached drawings, wherein:

FIG. 1 schematically shows a cellular communication system according to an embodiment of the present invention;

FIGS. 2A and 2B schematically show examples of array elements implementing configurations of a beamforming antenna, and corresponding beam distributions, respectively;

FIG. 3 shows an activity diagram of a method according to an embodiment of the present invention;

FIG. 4 schematically shows cell sectors for a 4×1 beamforming antenna, an 8×1 beamforming antenna and an 8×2 beamforming antenna, according to an embodiment of the present invention;

FIG. 5A shows an exemplary envelope traffic radiation pattern (left drawing), and an exemplary "modulated" envelope traffic radiation pattern (right drawing) for an 8×1 beamforming antenna, according to an embodiment of the present invention, and FIG. 5B shows exemplary opposite front and rear cell sector pairs for an envelope traffic radiation pattern of an 8×1 beamforming antenna, according to an embodiment of the present invention.

DETAILED DESCRIPTION OF PREFERRED EMBODIMENTS OF THE INVENTION

With reference to the drawings, a cellular communication system 100 (i.e., a portion thereof) according to an embodiment of the present invention is schematically illustrated in FIG. 1.

In the following, when one or more features of the cellular communication system 100 (and of a method implemented by it) are introduced by the wording "according to an embodiment", they are to be construed as features additional or alternative to any features previously introduced, unless otherwise indicated and/or unless there is evident incompatibility among feature combinations that is immediately apparent to the person skilled in the art.

In the following, only relevant features of the cellular communication system 100 that are deemed relevant for the understanding of the present invention will be discussed, with well-known and/or obvious variants of the relevant features that are omitted for the sake of conciseness.

According to an embodiment, the cellular communication system 100 is compliant with fifth generation (5G) technology standard for broadband cellular communication systems.

According to an embodiment, the cellular communication system 100 comprises a cellular network (e.g., a 5G cellular network).

According to an embodiment, the cellular network comprises a plurality of cellular communication equipment or base stations 105 providing radio coverage over a geographic area (usually referred to as geographic area covered by the cellular network).

According to an embodiment, the base stations 105 (or at least a subset thereof) comprise 5G base stations (usually referred to as gNodeBs). Just as an example, each 5G base station may have a standalone architecture or a CU ("Central Unit")—DU ("Distributed Unit") architecture.

According to an embodiment, each base station 105 is configured to provide radio coverage over (or, equivalently, is associated with) one or more regions of the geographic area, or network cell, 110.

In the exemplary considered embodiment, the cellular network comprises a plurality of network cells 110.

In the exemplary, simplified scenario herein considered, each base station 105 is associated with a respective network cell 110. In practical scenarios, each base station 105 may be associated with a plurality of network cells (such as three network cells). Without losing generality, each base station 105 may be associated with a number of network cells depending on the architecture of the base station 105.

According to an embodiment, as exemplary illustrated, each network cell 110 is hexagonal in shape. In practice, though, the shape of each network cell 110 may differ significantly from an ideal hexagonal shape, e.g. due to geographical and/or propagation characteristics or constraints in the region (of the geographic area) identified by the network cell.

According to an embodiment, the base station 105 allow user devices UD within the respective network cells 110 (and connecting/connected to the cellular communication system 100) to exchange data traffic (e.g., web browsing, e-mailing, voice, or multimedia data traffic).

The user devices UD may for example comprise personal devices owned by users of the cellular network (the users being for example subscribers of services offered by the cellular communication system 100). Examples of user devices UD comprise, but are not limited to, mobile phones, smartphones, tablets, personal digital assistants and computers.

According to an embodiment, the cellular network forms the radio access network.

According to an embodiment, the radio access network (and, more generally, the cellular communication system 100) is based on NR ("New Radio") radio access technology, i.e. the radio access technology developed by 3$^{rd}$ Generation Partnership Project (3GPP) for the 5G (fifth generation) cellular network.

According to an embodiment, the cellular communication system 100 may support one or more further radio access technologies among UTRA ("UMTS Terrestrial Radio Access"), WCDMA ("Wideband Code Division Multiple Access"), CDMA2000, LTE ("Long Term Evolution") and LTE-Advanced radio access technologies.

According to an embodiment, the radio access network is communicably coupled (e.g., by a wired coupling and/or wireless coupling) with one or more core networks, such as the core network 115. The core network 115 may be any type of network configured to provide aggregation, authentication, call control/switching, charging, service invocation, gateway and subscriber database functionalities, or at least a subset (i.e., one or more) thereof.

According to an embodiment, the core network 115 comprises a 5G core network.

According to an embodiment, the core network 115 is communicably coupled with other networks, such as the Internet and/or public switched telephone networks (not shown).

According to an embodiment, the cellular communication system 100 is configured to collect procedure and/or event traces at respective network apparatuses (such as the base stations 105).

According to procedure and/or event traces, for each user device UD connected to the cellular communication system 100, procedures and/or events (including, but are not limited to, voice call, data call, and related signaling procedures) are traced, e.g. in order to allow periodically detecting the signal strengths associated with a respective serving network cell (and, preferably, the signal strengths associated with network cells adjacent to the serving network cell).

According to an embodiment, the traced procedures and/or events are geo-localized traced procedures and/or events.

According to an embodiment, geo-localization of the traced procedures and/or events may be achieved by means of "Angle of Arrival" information, "Global Navigation Satellite System" (GNSS)/"Assisted Global Navigation Satellite System" (A-GNSS) information, and triangulation techniques.

According to an embodiment, the cellular communication system 100 is configured to collect radio measurements reported by the user devices UD connected to the cellular network. According to an embodiment, radio measurement reporting is performed by the user devices UD through "Minimization of Drive Test" (MDT) functionality.

According to an embodiment, the radio measurements reported by the user devices UD through MDT functionality are combined with positioning information. Positioning information may for example be provided by the user devices UD (e.g., by exploiting GPS and/or GNSS/A-GNSS functionalities thereof) and/or computed by the cellular communication system 100 (e.g., by the core network 115) based on the radio measurements. Examples of positioning information computed by the cellular communication system 100 include, but are not limited to, ranging measurements based on localization signals emitted by any properly configured base station, and/or triangulations on signals of the cellular network.

In the following, the procedures and/or events traces, and/or the radio measurements reported by the user devices UD (for example, through MDT functionality) will be concisely referred to as tracing/reporting data.

According to an embodiment, the tracing/reporting data comprises geo-localized tracing/reporting data for each one of a plurality of territorial portions of the geographic area (hereinafter, territorial pixels). In this embodiment, for each territorial pixel, the procedures and/or events traces comprise procedure and/or event traces of user devices within the territorial pixel, and the radio measurements comprise radio measurements reported by the user devices within the territorial pixel.

According to an embodiment, each territorial pixel represents a small or relatively small portion of the geographic area. Just as an example, each territorial pixel may have a size of approximatively 50 m×50 m in extra-urban scenarios and approximatively 10 m×10 m in urban scenarios.

According to an embodiment, each territorial pixel is identified by latitude i and longitude j coordinates—hereinafter, coordinates (i,j).

According to an embodiment, each network cell at least partially covers, or at least partially overlaps to, a plurality of (i.e., two or more) territorial pixels.

According to an embodiment, each territorial pixel may be covered by one or more network cells. In the following, for the sake of conciseness, each network cell at least partially covering, or at least partially overlapping to, a territorial pixel will be referred to as overlapping network cell.

According to an embodiment, the cellular communication system 100 comprises one or more databases (herinafter, network database) 120 for storing the (e.g., geo-localized) tracing/reporting data associated with each territorial pixel.

According to an embodiment, the network database 120 is configured to store, for each territorial pixel, the tracing/reporting data resulting from a measurement campaign performed over a time period (hereinafter, campaign time period) in that territorial pixel. Just as an example, the campaign time period may be of the order of one or more days.

According to an embodiment, the network database 120 may be updated periodically.

According to an embodiment, the network database 120 may be updated aperiodically.

As better discussed in the following, in embodiments of the present invention the tracing/reporting data stored in the network database 120 may be used for estimating a relative importance of each territorial pixel in terms of amounts of data traffic (or, equivalently, of service requests) that are expected to be generated in that territorial pixel.

According to an embodiment, the network database 120 is located within the cellular network (as illustrated). According to an alternative embodiment, not shown, the network database 120 is located within the core network 115 (e.g., in one or more modules thereof). Without losing generality, the network database 120 may be located in any other entity of the cellular network or of the cellular communication system 100.

According to an embodiment, the cellular communication system 100 comprises one or more databases (herinafter, territorial database) 125 for storing territorial data related to each territorial pixel.

According to an embodiment, the territorial data comprises, for each territorial pixel, an indication of a road network in that territorial pixel, such as type of roads (e.g., highways, expressways, municipal roads and/or provincial roads) and road lengths.

According to an embodiment, additionally or alternatively to the indication of the road network, the territorial data comprises, for each territorial pixel, an indication of an urbanization rate in that territorial pixel. By urbanization rate it is herein meant a level of urban development relative to the overall population.

According to an embodiment, additionally or alternatively to the indication of the road network and/or to the indication of the urbanization rate, the territorial data comprises, for each territorial pixel, an indication of a type or use of the respective territory (e.g., urban territory, suburban territory, rural territory and/or cultivated territory).

According to an embodiment, the territorial database 125 may be updated periodically.

According to an embodiment, the territorial database 125 may be updated aperiodically.

As better discussed in the following, in embodiments of the present invention the territorial data stored in the territorial database 125 may be used for estimating a relative importance of each territorial pixel in terms of amounts of data traffic (or, equivalently, of service requests) that are expected to be generated in that territorial pixel.

According to an embodiment, the territorial database 125 is located within the cellular network (as illustrated). According to an alternative embodiment, not shown, the territorial database 125 is located within the core network 115 (e.g., in one or more modules thereof). Without losing generality, the network database 125 may be located in any other entity of the cellular network or of the cellular communication system 100.

According to an embodiment, the cellular communication system 100 comprises one or more computation modules 130 for computing a signal-to-interference-plus-noise ratio (SINR) associated with each territorial pixel.

As better discussed in the following, according to an embodiment the computation module 130 is configured to compute the SINR based on at least one between the tracing/reporting data stored in the network database 115 and the territorial data stored in the territorial database 125 (this is schematically shown in the figure by arrow connection between the computation module 130 and the cellular network). However, as better discussed in the following, embodiments of the present invention may be envisaged in which none between the tracing/reporting data and the territorial data is taken into account for computing the SINR.

As better discussed in the following, according to an embodiment the cellular communication system 100 is configured to suitably process the computed SINR.

According to an embodiment, the cellular communication system 100 may be configured to output (e.g., on request) the computed SINR (e.g., for statistical purposes).

According to an embodiment, the cellular communication system 100 may be configured to set (i.e., tune or adjust) one or more parameters of the cellular network (hereinafter, network parameters), such as antenna parameters, based on the computed SINR. Without losing generality, the cellular communication system 100 may be configured to set, based on the computed SINR, the network parameter(s) by exploiting functionalities of one or more among the core network 115, the computation module 130 and a "Self-Organizing Network" (SON) module (not shown).

According to an embodiment, each base station 105 comprises one or more electronic apparatuses (not shown). Examples of electronic apparatuses include, but are not limited to, transceivers and digital signal processors.

According to an embodiment, each base station 105 comprises one or more radiating apparatuses or antennas.

According to an embodiment, the base stations 105, or at least a subset thereof, comprise beamforming active antennas.

By beamforming antenna, it is herein meant a radiating apparatus comprising a plurality of antenna elements (each one corresponding to the smallest radiating element which is part of the radiating apparatus), and a plurality of arrays of antenna elements (hereinafter concisely referred to as array elements), each one comprising a set of antenna elements (i.e., the smallest set of antenna elements) that can be singularly activated to generate, together with the other antenna elements of the array element, a directional beam having minimum angular amplitude. Just as an example, each array element may generate directional beams by means of proper time or phase shifting of the radio signals emitted by the respective antenna elements.

A beamforming antenna may be usually indicated by a "product" between a number of array elements arranged in horizontal radiating direction H (hereinafter, horizontal array elements)

$$N_{AR}^{H}$$

and a number of array elements arranged in vertical radiating direction I (hereinafter, vertical array elements)

$$N_{AR}^{V}.$$

Examples of array elements implementing a 4×1 beamforming antenna $$\left(\text{i.e., } N_{AR}^{H} = 4 \text{ and } N_{AR}^{V} = 1\right),$$

a 8×1 beamforming antenna $$\left(\text{i.e., } N_{AR}^{H} = 8 \text{ and } N_{AR}^{V} = 1\right),$$

and a 8×2 beamforming antenna $$\left(\text{i.e., } N_{AR}^{H} = 8 \text{ and } N_{AR}^{V} = 2\right)$$

are schematically illustrated in FIG. 2A, and the corresponding beam distributions are illustrated in FIG. 2B.

By active antenna, it is herein meant a radiating apparatus that:

- may be described by one or more broadcast radiation patterns and by one or more traffic radiation patterns, and
- is capable of real-time performing radiation pattern reconfiguration to serve, with performance continuity, user devices UD that may change position and/or typology of requested services over time.

For the purposes of the present disclosure, a broadcast radiation pattern identifies the directional (angular) dependence of the strength of the broadcast beams from the antenna. By broadcast beams generated by a base station 105 are herein meant the beams containing common information for all user devices, and determining a size of the respective network cell 110. The broadcast beams may relate to one or more logical channels, such as broadcast channel.

For the purposes of the present disclosure, a traffic radiation pattern identifies the directional (angular) dependence of the strength of the traffic beams from the antenna. By traffic beams generated by a base station 105 are herein meant the beams containing specific information for independent user devices, and determining the performance that the base station 105 may offer over the respective network cell 110. The traffic beams may relate to one or more logical channels, such as traffic channel.

According to an embodiment, the beamforming active antenna of the cellular communication system 100 is described by a single traffic radiation pattern (hereinafter referred to as envelope traffic radiation pattern) obtained by the envelope of a plurality of traffic radiation patterns each one indicative of amplitude and gain of respective elementary traffic beams having minimum angular amplitude (i.e., maximum antenna gain) in each respective radiating direction.

For the purposes of the present disclosure, for each territorial pixel, one among the overlapping network cells identifies a respective best server network cell (not shown), i.e. the area served by the respective base station acting as best server in that territorial pixel.

According to an embodiment, a base station acts as a best server in a territorial pixel if:

- the respective network cell at least partially covers, or at least partially overlaps to, that territorial pixel, i.e. if the respective network cell is an overlapping network cell for that territorial pixel; according to an embodiment, a network cell is an overlapping network cell for a territorial pixel if a signal strength or level associated with the broadcast channel (hereinafter, broadcast signal strength) estimated for the respective base station is higher, in that territorial pixel, than a minimum broadcast signal strength (e.g., a minimum signal strength that is required for a user device to connect to the base station), and
- the signal strength or level associated with the traffic channel (hereinafter, traffic signal strength) estimated for that base station is, in that territorial pixel, the highest among the traffic signal strengths associated with any other base station whose network cell is an overlapping network cell for that territorial pixel, and higher than a minimum traffic signal strength (should the traffic signal strength be lower than the minimum traffic signal strength, then the territorial pixel would be uncovered, i.e. there would be no base station serving that territorial pixel).

According to an embodiment, the minimum broadcast signal strength is different from the minimum traffic signal strength.

According to an embodiment, the broadcast signal strength is estimated, for each base station 105, based on the broadcast radiation pattern of the respective radiating apparatus.

According to an embodiment, the traffic signal strength is estimated, for each base station 105, based on the envelope traffic radiation pattern of the respective radiating apparatus. Since, as discussed above, the envelope traffic radiation pattern is obtained by the envelope of the traffic radiation patterns each one corresponding to an elementary traffic beam with minimum angular amplitude (and, hence, maximum antenna gain) in each radiating direction, the traffic signal strength estimated in a territorial pixel corresponds to a best or maximum traffic signal strength that can be guaranteed by the base station in that territorial pixel, obtained by ideally pointing the elementary traffic beam having minimum angular amplitude towards a user positioned in that territorial pixel (as better discussed in the following, this allows estimating in each territorial pixel the throughput that can be experienced by a user if this user would be the only user connected to the best server base station for that territorial pixel, hereinafter user throughput).

In the following, for each territorial pixel, the respective overlapping network cell identified by a base station acting as a best server in that territorial pixel will be also referred to as best server network cell, and the respective remaining overlapping network cells will be also referred to as interfering network cells. Thus, in the exemplary considered scenario, each territorial pixel is at least partially covered by a best server network cell and by one or more interfering network cells.

For the purposes of the present disclosure, the network cells (110), or at least a subset thereof, are provided (i.e., generated or obtained) by a beamforming active antenna configured to radiate traffic beams in a plurality of radiating directions depending on number and arrangement of the array elements With reference to FIG. 3, it shows an activity diagram of a method 300 according to an embodiment of the present invention.

According to an embodiment, the method 300 is implemented by the computation module 130. However, this should not be construed limitatively: in fact, according to an embodiment, at least a subset of the method steps may be implemented by the core network 115, and/or by one or more other entities or modules of the cellular communication system 100 (such as a SON module, not shown).

According to an embodiment, the method 300 comprises subdividing each network cell into a number $N_{ppg}$ (e.g., a plurality) of cell sectors each one corresponding to a respective radiating direction among the plurality of radiating directions in which the corresponding beamforming active antenna is configured to radiate (action node 305). By cell sector corresponding to a respective radiating direction, it is herein meant an angular/spatial sector or portion of network cell in the radiating direction (with the radiating direction that may identify a central or substantially central axis of the angular/spatial sector or portion, or a side thereof).

According to an embodiment, as expected in a practical scenario, the number $N_{ppg}$ of cell sectors into which each network cell is subdivided may differ over the network cells (or over groups of networks cells), e.g. depending on the radiating apparatuses (as discussed here below).

According to an embodiment, number and arrangement of the cell sectors depend on a resolution with which the radiating apparatus is capable of generating elementary traffic beams in the horizontal H and/or vertical V radiating directions.

According to an embodiment, the resolution with which the radiating apparatus is capable of generating elementary traffic beams in the horizontal H and/or vertical V radiating directions depends on a geometry of the radiating apparatus.

According to an embodiment, the resolution with which the radiating apparatus is capable of generating elementary beams in the horizontal H and/or vertical V radiating directions depends on the number of horizontal array elements $$N_{AR}^{H}$$

and on the number of vertical array elements $$N_{AR}^{V}.$$

In this embodiment, the number $N_{ppg}$ of cell sectors corresponds to the product $$N_{AR}^{H} \times N_{AR}^{H}.$$

This is schematically illustrated in FIG. 4 for the 4×1 beamforming antenna (top drawing), for the 8×1 beamforming antenna (middle drawing), and for the 8×2 beamforming antenna (bottom drawing): as visible in this figure, cell sectors I-IV ($N_{ppg}$=4) are obtained in the horizontal radiating direction for the 4×1 beamforming antenna, cell sectors I-VIII ($N_{ppg}$=8) are obtained in the horizontal radiating direction for the 8×1 beamforming antenna, and cell sectors I-VIII are obtained in both horizontal and vertical radiating directions ($N_{ppg}$=16) for the 8×2 beamforming antenna.

According to an embodiment, the method 300 comprises determining, for each k-th cell sector (k=1, 2, . . . , $N_{ppg}$) of each network cell, an indication of a probability that the respective base station (i.e., the respective beamforming active antenna) radiates traffic beams in that k-th cell sector (action node 310). In the following, the indication of the probability that a base station (or, equivalently, the respective beamforming active antenna) radiates in a k-th cell sector will be concisely referred to as radiation probability $$\beta_{H,V}^{ppg}(k)$$

or radiation probability $$\beta_{H,V}^{ppg}(k)$$

associated with the k-th cell sector.

According to an embodiment, the radiation probability $$\beta_{H,V}^{ppg}(k)$$

associated with the k-th cell sector of a network cell depends on a propensity of the users (or, equivalently, of the user devices) to be physically located in that k-th cell sector and/or to generate service requests in that k-th cell sector of that network cell (hereinafter, user propensity).

According to an embodiment, the user propensity (and, hence, the radiation probability $$\beta_{H,V}^{ppg}(k))$$

may be based on the tracing/reporting data (e.g., the tracing/reporting data stored in the network database 120). Just as an example, the higher the traced procedures and/or events reported by user devices in a territorial pixel (or part thereof), the higher the user propensity in that territorial pixel.

According to an embodiment, the user propensity (and, hence, the radiation probability $$\beta_{H,V}^{ppg}(k))$$

may be based on the territorial data (e.g., the territorial data stored in the territorial database 125). Just as an example, the more structured and/or long the road network in a territorial pixel, the higher the user propensity in that territorial pixel. Just as another example, the higher the urbanization rate in a territorial pixel, the higher the user propensity in that territorial pixel. Just as a further example, the more the type or use of the territory in a territorial pixel is urban, the higher the user propensity in that territorial pixel.

According to an embodiment, the radiation probability $$\beta_{H,V}^{ppg}(k)$$

associated with the k-th cell sector may be determined as follows:

$$\beta_{H,V}^{ppg}(k) = \frac{\sum_{(i,j)\in\Omega_k} p(i,j)}{\sum_{k=1}^{N_{ppg}}} = \frac{p_k}{\sum_{k=1}^{N_{ppg}} p_k}$$

wherein:

p(i,j) is the user propensity associated with the territorial pixel identified by coordinates (i,j);

$\Omega_k$ is the set of territorial pixels belonging to the k-th cell sector. By territorial pixel belonging to a k-th cell sector is herein meant the territorial pixel that, based on geometrical considerations (such as shape and size of the territorial pixel and/or number of horizontal array elements $$N_{AR}^{H}$$

and number of vertical array elements $$N_{AR}^{V}),$$

falls within the k-th cell sector; and $p_k=\Sigma_{(i,j)\in\Omega_k} p(i,j)$ is the user propensity associated with each k-th cell sector.

In other words, the radiation probability $$\beta_{H,V}^{ppg}(k)$$

associated with the k-th cell sector of each network cell may be determined by normalizing the user propensity associated with the k-th cell sector on an overall user propensity associated with that network cell (i.e., the $N_{ppg}$ user propensities associated with the $N_{ppg}$ cell sectors of that network cell).

As better understood from the following discussion, the radiation probabilities $$\beta_{H,V}^{ppg}(k)$$

associated with the k-th cell sectors of a network cell determine an interference reduction (when that network cell acts as an interfering network cell) and, hence, a SINR increase.

In embodiments in which the cellular network comprises, additionally to the beamforming active antennas, one or more conventional antennas (i.e., one or more non-beamforming antennas):

$$N_{AR}^{H} = N_{AR}^{V} = 1$$

and hence a single cell sector ($N_{ppg}$=1) and a single radiation probability would be obtained for these antennas. In these embodiments, the radiation probability is equal to 1, in that:

$$p_k = \sum_{j=1}^{N_{ppg}} p_k.$$

which means that the corresponding radiating apparatus always radiates on the whole network cell.

In embodiments in which no user propensity associated with each k-th cell sector is determined based on the tracing/reporting data or on the territorial data, same user propensity may be assumed in all radiating directions, and hence each k-th cell sector would feature same radiation probability $$\beta_{H,V}^{ppg}(k):$$

$$\beta_{H,V}^{ppg}(k) = \frac{1}{N_{ppg}} \quad \forall\, k \in [1, N_{ppg}]$$

In embodiments in which interference reduction induced by the radiation probabilities $$\beta_{H,V}^{ppg}(k)$$

is requested not to fall below a predetermined threshold radiation probability $\beta_{threshold}$ (so as not to consider the interference contribution as practically negligible), if, for each network cell (i.e., for each considered network cell), at least one cell sector exists whose radiation probability $$\beta_{H,V}^{ppg}(k)$$

is lower than or equal to the threshold radiation probability $\beta_{threshold}$ (hereinafter referred to as low radiation probability cell sector, as opposed to a high radiation probability cell sector whose radiation probability $$\beta_{H,V}^{ppg}(k))$$

is higher than the threshold radiation probability $\beta_{threshold}$), the radiation probability $$\beta_{H,V}^{ppg}(k)$$

may be set as:

$$\begin{cases} \beta_{H,V}^{ppg}(k) \rightarrow \beta_{threshold} & \text{if } \beta_{H,V}^{ppg}(k) \leq \beta_{threshold} \\ \beta_{H,V}^{ppg}(k) \rightarrow \beta_{H,V}^{ppg}(k) - \Delta_{TOT}\dfrac{\beta_{H,V}^{ppg}(k) - \beta_{threshold}}{\sum_{k:\beta_{H,V}^{ppg}(k)>\beta_{threshold}}\left(\beta_{H,V}^{ppg}(k) - \beta_{threshold}\right)} & \text{if } \beta_{H,V}^{ppg}(k) > \beta_{threshold} \end{cases}$$

with $$\Delta_{TOT} = \sum_{k=1}^{N_{ppg}} \Delta_k = \sum_{k=1}^{N_{ppg}} \max\left[\left(\beta_{threashold} - \beta_{H,V}^{ppg}(k)\right); 0\right]$$

wherein $\Delta_k$ represents a compensation amount to be added to the radiation probability $$\beta_{H,V}^{ppg}(k)$$

associated with the k-th low radiation probability cell sector of a network cell to reach the predetermined threshold radiation probability $\beta_{threshold}$, and $\Delta_{TOT}$ represents a compensation amount over the $N_{ppg}$ cell sectors of that network cell (i.e., the compensation amount to be added, as a whole, to the low radiation probability cell sectors of that network cell). In other words, for each network cell, $\Delta_k$ represents a compensation amount indicative of a deviation between the threshold radiation probability $\beta_{threshold}$ and the radiation probability $$\beta_{H,V}^{ppg}(k)$$

associated with the k-th cell sector of that network cell, and $\Delta_{TOT}$ represents a compensation amount indicative of an overall deviation between the threshold radiation probability $\beta_{threshold}$ and the radiation probabilities $$\beta_{H,V}^{ppg}(k)$$

associated with the low radiation probability cell sectors of that network cell.

Thus, in these embodiments, for each network cell, if at least one low radiation probability cell sector exists, the radiation probability $$\beta_{H,V}^{ppg}(k)$$

may be set, for each k-th cell sector of the considered network cell:

if the radiation probability $$\beta_{H,V}^{ppg}(k)$$

is lower than or equal to the threshold radiation probability $\beta_{threshold}$, at the threshold radiation probability $\beta_{threshold}$ (this ensures that each radiation probability is at least equal to or higher than a minimum radiation probability represented by the threshold radiation probability $\beta_{threshold}$); and if the radiation probability $$\beta_{H,V}^{ppg}(k)$$

is higher than the threshold radiation probability $\beta_{threshold}$, at the radiation probability $$\beta_{H,V}^{ppg}(k)$$

subtracted by the compensation amount $\Delta_{TOT}$ indicative of the overall deviation between the threshold radiation probability ($\beta_{threshold}$) and the radiation probabilities $$\beta_{H,V}^{ppg}(k)$$

of the low radiation probabilities cell sectors. According to an embodiment, if the radiation probability $$\beta_{H,V}^{ppg}(k)$$

is higher than the threshold radiation probability $\beta_{threshold}$, the radiation probability $$\beta_{H,V}^{ppg}(k)$$

may be set at the radiation probability $$\beta_{H,V}^{ppg}(k)$$

subtracted by a fraction of the compensation amount $\Delta_{TOT}$. According to the exemplary considered embodiment, the fraction of the compensation amount $\Delta_{TOT}$ is proportional to a deviation between the radiation probability $$\beta_{H,V}^{ppg}(k)$$

associated with the k-th high radiation probability cell sector and the threshold radiation probability $\beta_{threshold}$—i.e., $$\left(\beta_{H,V}^{ppg}(k) - \beta_{threshold}\right)$$

—with respect to an overall deviation between the radiation probabilities $$\beta_{H,V}^{ppg}(k)$$

associated with the high radiation probability cell sectors and the threshold radiation probability $\beta_{threshold}$—i.e., $$\sum_{k:\beta_{H,V}^{ppg}(k)>\beta_{threshold}} \left(\beta_{H,V}^{ppg}(k) - \beta_{threshold}\right).$$

Back to the activity diagram, according to an embodiment the method 300 comprises, for each territorial pixel (or for each territorial pixel for which the SINR has to be computed), determining, among the plurality of network cells, a respective best server network cell (i.e., the network cell overlapping that territorial pixel and identified by a base station acting as a best server in that territorial pixel) and at least one respective interfering network cell (i.e., each network cell, other than the best server network cell, overlapping that territorial pixel) (action node 320).

According to an embodiment, as discussed above, a base station acts as a best server in a territorial pixel if the respective broadcast signal strength is higher, in that territorial pixel, than the minimum broadcast signal strength, and the respective traffic signal strength is, in that territorial pixel, the highest one (and higher than the minimum traffic signal strength).

Back to the activity diagram, according to an embodiment the method 300 comprises computing the SINR for each territorial pixel (action node 325).

According to an embodiment, the SINR (SINR(i,j)) in the territorial pixel identified by coordinates (i,j) is computed as:

$$SINR(i,j) = \frac{c_{bs}(i,j)}{\sum_{p\neq bs} c_p(i,j)\cdot \min\left(1, \frac{SC_{bs}\cdot NumPRB_{bs}}{SC_p\cdot NumPRB_k}\right)\cdot \alpha_p^t \cdot \beta_{H,V}^{ppg}(k) + N}$$

wherein:

$C_{bs}$ (i, j) is the (useful) signal strength related to the best server network cell associated with the territorial pixel;

$C_p$(i, j) is the (interfering) signal strength related to the p-th interfering cell;

$SC_{bs}$ is the subcarrier spacing (in kHz) for the best server network cell;

$SC_p$ is the subcarrier spacing (in kHz) for the p-th interfering cell;

$NumPRB_{bs}$ is the total number of physical resource blocks available in the best server network cell;

$NumPRB_p$ is the total number of physical resource blocks available in the p-th interfering cell;

$$\alpha_p^t$$

is a time activity factor associated with the p-th interfering cell, i.e. a factor indicative of a cell load status of the p-th interfering cell, and particularly a factor indicative of the (average) fraction of time during which the p-th interfering cell is exchanging data with one or more user devices connected thereto;

$$\beta_{p,H,V}^{ppg}(k)$$

is the radiation probability associated with the k-th cell sector of the p-th interfering cell at least partially covering the territorial pixel, and N is the thermal noise.

In other words, the SINR in each territorial pixel is computed based on the useful signal strength associated with the best server network cell, and (sum of) interfering signal strengths associated with the interfering network cells, wherein each interfering signal strength is weighted by a respective radiation probability $$\left(\beta_{p,H,V}^{ppg}(k)\right)$$

associated with the k-th cell sector of the respective p-th interfering network cell at least partially covering the territorial pixel.

Thus, the use of a beamforming active antenna in a 5G cellular network determines an increased SINR, and hence an increased user throughput (see, for example, the Throughput-SINR link level curve for estimating or computing the user throughput from the SINR), due to the attenuation of the interferential contributions that is induced by the radiation probabilities of the interfering network cells.

Particularly, the radiation probabilities associated with the $N_{ppg}$ cell sectors generate a “modulated” envelope traffic radiation pattern, i.e. an envelope traffic radiation pattern modulated as a function of the propensity of the users (or, equivalently, of the user devices) to be physically located and/or to generate service requests in the k-th cell sectors. An exemplary envelope traffic radiation pattern, and an exemplary “modulated” envelope traffic radiation pattern are represented in FIG. 5A for an 8×1 beamforming antenna.

Although in the foregoing the cell sectors have been obtained by taking into account the main lobe of the envelope traffic radiation pattern (which give rise to a subdivision of the best server network cell into front cell sectors), the principles of the present invention equivalently apply in embodiments in which (as illustrated in FIG. 5A) back lobes of the envelope traffic radiation pattern (i.e., the side lobes directly behind the main lobe) activate contextually to the activation of the main lobe in the direction of a service request.

In this embodiment, the method 300 may further comprise subdividing the network cell into rear cell sectors (i.e., cell sectors positioned behind the front cell sectors) each one opposite to a respective front cell sector with respect to the radiating apparatus (i.e., the beamforming active antenna).

An example of opposite front and rear cell sector pairs for the envelope traffic radiation pattern of an 8×1 beamforming antenna is illustrated in FIG. 5B (wherein the black circle represents the radiating apparatus).

According to an embodiment, the method 300 may comprise, upon determining the radiation probabilities $$(\beta_{H,V}^{ppg}(k))$$

associated with the front cell sectors (as discussed above), assigning to each rear cell sector the radiation probability $$\beta_{H,V}^{ppg}(k)$$

associated with the respective opposite front cell sector.

Back to the activity diagram, according to an embodiment the method 300 comprises managing the cellular network (or, more generally, the cellular communication system 100) based on the computed SINR (action node 330).

According to an embodiment, the method 300 may comprise, at action node 330, outputting (e.g., on request) the computed SINR (e.g., for statistical purposes).

According to an embodiment, the method 300 may comprise, at action node 330, setting (i.e., tuning or adjusting) one or more network parameters based on the computed SINR (e.g., by exploiting functionalities of one or more among the core network 115, the computation module 130 and a SON module).

According to an embodiment, action nodes 320-330 (or at least nodes 320 and 325) are repeated for each territorial pixel. This is conceptually shown in the figure by decision node 315.

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

For example, the cellular communication system may have a different structure or include equivalent components. Moreover, any component of the the cellular communication system may be separated into several elements, or two or more components may be combined into a single element; furthermore, each component can be replicated to support the execution of the corresponding operations in parallel. It should also be noted that (unless otherwise indicated) any interaction between different components generally does not need to be continuous, and may be either direct or indirect through one or more intermediaries.

In addition, the present invention lends itself to be implemented through an equivalent method (by using similar steps, removing some steps being not essential, or adding further optional steps); moreover, the steps may be performed in different order, concurrently or in an interleaved way (at least partly).

The invention claimed is:

1. Method for computing a signal-to-interference-plus-noise ratio in a territorial portion of a geographic area covered by a cellular network, wherein the cellular network comprises a plurality of network cells provided by respective beamforming active antennas each one configured to radiate traffic beams in a plurality of radiating directions depending on number and arrangement of array elements of the beamforming active antenna, the method comprising:

subdividing each network cell into a plurality of cell sectors each one corresponding to a respective radiating direction among the plurality of radiating directions in which the corresponding beamforming active antenna is configured to radiate;

determining, for each cell sector of each network cell, a respective radiation probability $$(\beta_{H,V}^{ppg}(k))$$

indicative of the probability that the respective beamforming active antenna radiates traffic beams in that cell sector, each radiation probability depending on a user propensity indicative of a propensity of users of the cellular network to be physically located and/or to generate service requests in that cell sector of that network cell;

determining, among the plurality of network cells, a best server network cell and at least one interfering network cell associated with the territorial portion, and computing the signal-to-interference-plus-noise ratio in the territorial portion based on a useful signal strength associated with the best server network cell, and at least one interfering signal strength associated with the at least one interfering network cell, wherein each interfering signal strength is weighted by a respective radiation probability $$\left(\beta_{H,V}^{ppg}(k)\right)$$

associated with the cell sector of the respective interfering network cell at least partially covering the territorial portion.

2. Method according to claim 1, wherein the user propensity is based on at least one among:

procedure and/or event traces of user devices within the territorial portion;

radio measurements reported by the user devices within the territorial portion;

territorial data related to the territorial portion.

3. Method according to claim 2, wherein the territorial data comprises at least one among:

an indication of a road network in the territorial portion;

an indication of an urbanization rate in the territorial portion;

an indication of a type or use of the territory of the territorial portion.

4. Method according to claim 1, wherein said determining, for each cell sector of each network cell, a respective radiation probability $$\left(\beta_{H,V}^{ppg}(k)\right)$$

comprises normalizing the user propensity associated with the cell sector on an overall user propensity associated with the network cell.

5. Method according to claim 1, wherein said determining, for each cell sector of each network cell, a respective radiation probability $$\left(\beta_{H,V}^{ppg}(k)\right)$$

further comprises, if, for each network cell, at least one first cell sector exists whose radiation probability $$\left(\beta_{H,V}^{ppg}(k)\right)$$

is lower than or equal to a threshold radiation probability ($\beta_{threshold}$):

setting the radiation probability of each first cell sector at the threshold radiation probability ($\beta_{threshold}$); and for each second cell sector whose radiation probability $$\left(\beta_{H,V}^{ppg}(k)\right)$$

is higher than the threshold radiation probability ($\beta_{threshold}$), setting the respective radiation probability at the radiation probability $$\left(\beta_{H,V}^{ppg}(k)\right)$$

subtracted by a compensation amount indicative of an overall deviation between the threshold radiation probability ($\beta_{threshold}$) and the radiation probabilities $$\beta_{H,V}^{ppg}(k)$$

of the at least one first cell sector.

6. Method according to claim 5, wherein, for each second cell sector, the compensation amount is proportional to a deviation between the radiation probability $$\left(\beta_{H,V}^{ppg}(k)\right.$$

associated with the second cell sector and the threshold radiation probability ($\beta_{threshold}$), with respect to an overall deviation between the radiation probabilities $$\left(\beta_{H,V}^{ppg}(k)\right)$$

associated with the second cell sectors and the threshold radiation probability ($\beta_{threshold}$).

7. Method according claim 1, wherein said subdividing each network cell into a plurality of cell sectors comprises subdividing each network cell into a plurality of front and rear cell sectors associated with main and back lobes, respectively, of a radiation pattern of the respective beamforming active antenna, each rear cell sector being opposite to a respective front cell sector with respect to the respective beamforming active antenna, and wherein said determining, for each cell sector of each network cell, a respective radiation probability $$\left(\beta_{H,V}^{ppg}(k)\right)$$

comprises determining the radiation probability $$\left(\beta_{H,V}^{ppg}(k)\right)$$

for each front cell sector and assigning to each rear cell sector the radiation probability $$\left(\beta_{H,V}^{ppg}(k)\right)$$

associated with the respective opposite front cell sector.

8. Method according to claim 1, further comprising managing the cellular network based on the computed signal-to-interference-plus-noise ratio.

9. Method according to claim 8, wherein said managing the cellular network based on the computed signal-to-interference-plus-noise ratio comprises at least one between:

outputting the computed signal-to-interference-plus-noise ratio, and setting one or more parameters of the cellular network based on the computed signal-to-interference-plus-noise ratio.

10. System for computing a signal-to-interference-plus-noise ratio in a territorial portion of a geographic area covered by a cellular network, wherein the cellular network comprises a plurality of network cells provided by respective beamforming active antennas each one configured to radiate traffic beams in a plurality of radiating directions depending on number and arrangement of array elements of the beamforming active antenna, the system comprising a computation module configured for:

subdividing each network cell into a plurality of cell sectors each one corresponding to a respective radiating direction among the plurality of radiating directions in which the corresponding beamforming active antenna is configured to radiate;

determining, for each cell sector of each network cell, a respective radiation probability $$(\beta_{H,V}^{ppg}(k))$$

indicative or the probability that the respective beamforming active antenna radiates traffic beams in that cell sector, each radiation probability depending on a user propensity indicative of a propensity of users of the cellular network to be physically located and/or to generate service requests in that cell sector of that network cell;

determining, among the plurality of network cells, a best server network cell and at least one interfering network cell associated with the territorial portion, and computing the signal-to-interference-plus-noise ratio in the territorial portion based on a useful signal strength associated with the best server network cell, and at least one interfering signal strength associated with the at least one interfering network cell, wherein each interfering signal strength is weighted by a respective radiation probability $$(\beta_{H,V}^{ppg}(k))$$

associated with the cell sector of the respective interfering network cell at least partially covering the territorial portion.

* * * * *